United States Patent [19]

Bauer

[11] Patent Number: 5,554,348
[45] Date of Patent: Sep. 10, 1996

[54] DIFFUSER ELEMENTS FACILITATING THE MASS TRANSFER IN SOLID/GAS REACTIONS

[75] Inventor: Jean-Michel Bauer, Pagny-sur-Moselle, France

[73] Assignee: Le Carbone-Lorraine, Courbevoie, France

[21] Appl. No.: 352,200

[22] Filed: Dec. 1, 1994

[30] Foreign Application Priority Data

Dec. 14, 1993 [FR] France ................... 93 15327

[51] Int. Cl.$^6$ ................ B01J 8/02; B01J 20/20
[52] U.S. Cl. ............... 422/211; 422/216; 422/218; 502/417; 428/307.7; 428/408
[58] Field of Search ............... 422/211, 216, 422/218, 238, 240, 171, 198, 184, 190; 428/307.7, 408; 502/417, 416; 165/DIG. 533, 907

[56] References Cited

U.S. PATENT DOCUMENTS

| 4,496,621 | 1/1985 | Hubert et al. | 426/236 |
| 4,944,996 | 7/1990 | Bauer et al. | 428/307.7 |
| 5,190,654 | 3/1993 | Bauer | 210/490 |
| 5,264,162 | 11/1993 | Salem et al. | 264/29.5 |

FOREIGN PATENT DOCUMENTS

| 4123262 | 4/1993 | Germany . |
| 2056423 | 3/1981 | United Kingdom . |

*Primary Examiner*—Nina Bhat
*Attorney, Agent, or Firm*—Dennison, Meserole, Pollack & Scheiner

[57] ABSTRACT

Diffuser elements are provided to facilitate mass transfer in endothermic or exothermic solid/gas reactions between a reactive gas and a reactive composite material and are implanted in the reactive composite material to facilitate the diffusion of the reactive gas. These diffuser elements are profiles formed of porous carbonaceous material. The elements have a small loss of charge in a circulation direction of the reactive gas, and in a diffusion direction perpendicular to the circulation direction, these elements have a measured resistance to crushing of at least 1 MPa and permeability of at least $10^{-5}$ m$^3$/M$^2$.s.Pa.

6 Claims, No Drawings

DIFFUSER ELEMENTS FACILITATING THE MASS TRANSFER IN SOLID/GAS REACTIONS

SPHERE OF THE INVENTION

The invention relates to solid/gas reactions and more particularly to reactions in which said solid which is to react with said gas is in an agglomerated form. In this case, implementation of these reactions can necessitate means to facilitate the mass transfer between the gaseous phase and the core of the agglomerated solid phase.

STATE OF THE ART

The use of reactions, which are generally reversible, between a solid (salt, activated carbon, catalyst, zeolite . . . ) and a gas, these reactions being either chemical or physical (adsorption, desorption) is increasing in industry.

The technology employed usually involves reacting the gas on the solid material, the solid material being in the form of a bed of solid particles in a column. The contact between the gas and the particles of the bed is ensured by the diffusion of the gas in this bed of particles which have not been packed or agglomerated. This contact between gas and particles can be further improved by the use of a fluidized bed of particles.

However, certain applications of solid/gas reactions demand that the reactive solid be agglomerated with a substrate, for reasons inherent in the process or in its industrial implementation.

All processes where one of the aims is to provide or extract calories resulting from the reaction heat between said solid and said gas can be mentioned in particular. In this case, the agglomerated solid is a reactive composite material comprising two solid phases: an actual reactive solid phase intended to react with said gas and a substrate phase intended to allow the exchange of heat with the exterior or a wall (removal or supply of heat depending whether the reaction between said reactive solid and said gas is exothermic or endothermic).

Expanded graphite is usually found as substrate as it is a material which is a good conductor of heat and has good properties of cohesion which facilitate the shaping thereof. The properties of this expanded graphite allow composite masses to be obtained which have mechanical cohesion and are porous, rich in reactive solid and conductors of heat.

The Patent Application WO 9115292 describes the production of such reactive composite materials having two solid phases, a reactive phase consisting of salts and a phase of expanded graphite, the entirety being recompressed sufficiently to obtain a reactive composite material having inherent mechanical strength and, furthermore, sufficient residual porosity to allow the diffusion of the reactive gas within the composite solid and thus to allow the reaction between said gas and said reactive solid.

PROBLEM POSED

Industrial requirements lead to the production of reactive composite materials in the form of increasingly large masses, rendering the diffusion of the gas in the residual porosity of the reactive composite material increasingly slow and difficult.

To solve this problem, one of the obvious solutions involves producing channels in the mass of said reactive composite material, for example by piercing parallel holes so that the thickness of substance between the channels thus formed is relatively slight and readily accessible to the reactive gases.

However, this solution is not satisfactory because the holes are progressively blocked in the course of time. In fact, said reactive composite material is the seat of a reversible reaction which is usually accompanied by variations in volume which gradually tend to impair the mechanical cohesion of the reactive composite material and, consequently, to block the perforated holes.

To overcome this problem, it has been proposed that the pierced holes be lined with porous tubes. Metallic tubes pierced radially with extremely fine holes (for example by laser radiation) have been used for this purpose. Although such tubes represent a technically satisfactory solution to the problem, their high cost makes this solution unsuitable from an economic point of view.

Ceramic tubes have also been tried, but have been abandoned mainly on account of the excessive increase in weight, slim light-weight ceramic tubes not being commercially available.

DESCRIPTION OF THE INVENTION

According to the invention, the diffuser elements intended to facilitate the mass transfer in solid/gas reactions (endothermic or exothermic) between a reactive gas and a reactive composite material comprising a reactive solid phase and a heat-conducting substrate phase based on expanded graphite which allow the exchange of heat between the core of said composite material and its external surface and are implanted in said reactive composite material to facilitate the diffusion of said reactive gas in the entirety of said reactive composite material are characterised in that a) these diffuser elements are profiles made of carbonaceous porous material (open porosity), b) these elements have a small head loss in the so-called "circulation" direction corresponding to the flow of said reactive gas from one end to the other of said element of less than 0.1 MPa per metre c) in the so-called "diffusion" direction perpendicular to said circulation direction, these elements have a measured resistance to crushing of at least 1 MPa and permeability of at least $10^{-5}$ $m^3/m^2.s.Pa$.

Following their research, the applicants were able to step aside from the methods employed hitherto and to select a material and a set of criteria allowing effective operation of the diffuser elements.

In particular, the applicants saw the value in using a porous carbonaceous material as gas diffuser.

The diffuser elements according to the invention form profiled elements in the form of plates, bars and tubes having porosity of at least 20% and preferably greater than 30% in the diffusion direction. In the case of tubes, the head loss is generally less than 0.05 MPa/m.

The external surface of the diffuser elements preferably has a mean porous diameter of between 10 and 200 μm, depending on the grain size of the reactive composite material and depending on its tendency to penetrate in the pores of the diffuser elements which is obviously undesirable.

The means defined according to the invention allow effective diffusion of the gases without an excessive head loss and without a significant modification to the diffusion regime in the course of time.

Bars of porous carbonaceous material which is homogeneous in the circulation direction and in the diffusion direction can be used as profiles according to the invention. These bars can be made of carbon foam having open porosity.

Profiles in the form of tubes can also be used. In this case, these tubes have a thickness of less than 2 mm and preferably have a diameter of between 3 and 20 mm.

From among the tubes which can be used according to the invention, those made of carbon/carbon composite material are preferred if the mechanical strength is the overriding factor.

EMBODIMENTS

Example 1

Porous tubes having a diameter of 10 mm and a thickness of 2 mm were produced from carbon/carbon composite by the process described in French Patent No. 2 582 956 (French Application No. 85-09264), more specifically by pull-extrusion of a mixture of carbon fibres and resins or pitches, then by carbonization. A tube which is well suited as a diffuser element is thus obtained.

Example 2

Tubes similar to those in Example 1 were produced by employing the process described in French Patent No. 2 654 382 (French Application No. 89-15284). With this process, the tube of carbon/carbon composite is formed by rolling a pre-impregnated sheet on a mandrel. A porous tube which is well suited as a diffuser element is obtained after final carbonization.

ADVANTAGES OF THE INVENTION

The solution found by the applicants allows a technical problem to be solved while also providing advantages which can be decisive in certain cases:

- on the one hand, the use of carbon profiles allows the equipment forming the seat of solid/gas reactions to be lightened in weight,
- on the other hand, the use of carbon profiles can allow corrosion problems to be solved - problems which will not fail to appear with metal tubes for example,
- finally, the technology for producing carbon tubes employed in the examples allows easy adjustment of the mechanical characteristics and of the porosity of the carbon tubes in particular so that the general technology for the production of tubes can easily be adapted to any particular case without involving excessive production costs.

I claim:

1. In combination:

a) a reactive composite material comprising a reactive solid phase and a heat-conducting substrate phase comprising expanded graphite; and b) a diffuser element for facilitating mass transfer in endothermic or exothermic reactions between a reactive gas and the reactive solid phase of said reactive composite material, said diffuser element comprising a carbonaceous material of open porosity formed generally in a shape selected from the group consisting of a plate, a bar and a tube, implanted within said reactive composite material, having a head loss of less than about 0.1 MPa per meter in a direction corresponding to flow of reactive gas through said diffuser element, and having a measured crushing resistance of at least about $10^{-5}$ $m^3/m^2.s.Pa$ in a diffusion direction generally perpendicular to said direction corresponding to flow, said diffuser element facilitating diffusion of the reactive gas throughout said reactive composite material, and allowing exchange of heat between a surface portion and a core portion of said reactive composite material in which said diffuser element is implanted.

2. The combination of claim 1, wherein said diffuser element has a porosity in the diffusion direction of at least about 20%.

3. The combination of claim 1, said diffuser element is in the shape of a bar and is formed of a carbonaceous material which is homogeneous is the circulation direction and the diffusion direction.

4. The combination of claim 1, wherein said diffuser element is in the shape of a tube.

5. The combination of claim 4, wherein said tube has a thickness of less than 2 mm and a diameter between about 3 and 20 mm.

6. The combination of claim 1, wherein said diffuser element is formed of a carbon-carbon composite material.

* * * * *

UNITED STATES PATENT AND TRADEMARK OFFICE
CERTIFICATE OF CORRECTION

PATENT NO. : 5,554,348
DATED : September 10, 1996
INVENTOR(S) : JEAN-MICHEL BAUER It is certified that error appears in the above-indentified patent and that said Letters Patent is hereby corrected as shown below:

Claim 3, line 3, change "is" (second occurrence) to --in--.

Signed and Sealed this

Tenth Day of June, 1997

Attest:

BRUCE LEHMAN

Attesting Officer

Commissioner of Patents and Trademarks